US011922827B2

(12) United States Patent
Chadwick et al.

(10) Patent No.: US 11,922,827 B2
(45) Date of Patent: Mar. 5, 2024

(54) LEARNING MANAGEMENT SYSTEMS AND METHODS THEREFOR

(71) Applicant: Obrizum Group Ltd., Cambridge (GB)

(72) Inventors: Matthew Chadwick, Cambridge (GB); Chibeza Chintu Agley, Cambridge (GB); Juergen Fink, Cambridge (GB); Sarra Achouri, Cambridge (GB); Joshua Heimbach, Cambridge (GB)

(73) Assignee: OBRIZUM GROUP LTD., Cambridge (GB)

( * ) Notice: Subject to any disclaimer, the term of this patent is extended or adjusted under 35 U.S.C. 154(b) by 374 days.

(21) Appl. No.: 16/957,013

(22) PCT Filed: Feb. 26, 2019

(86) PCT No.: PCT/GB2019/050521
§ 371 (c)(1),
(2) Date: Jun. 22, 2020

(87) PCT Pub. No.: WO2019/166790
PCT Pub. Date: Sep. 6, 2019

(65) Prior Publication Data
US 2021/0366303 A1 Nov. 25, 2021

(30) Foreign Application Priority Data
Feb. 28, 2018 (GB) .................................... 1803270

(51) Int. Cl.
*G09B 7/08* (2006.01)
*G09B 7/04* (2006.01)

(52) U.S. Cl.
CPC . *G09B 7/08* (2013.01); *G09B 7/04* (2013.01)

(58) Field of Classification Search
CPC .................................... G09B 7/08; G09B 7/04
See application file for complete search history.

(56) References Cited

U.S. PATENT DOCUMENTS 5,615,347 A * 3/1997 Davis .................. G06F 3/04847
715/833
6,216,134 B1 * 4/2001 Heckerman ........... G06F 16/358
707/999.005

(Continued)

FOREIGN PATENT DOCUMENTS

| CN | 107680019 | 2/2018 |
| EP | 1256920 | 11/2002 |
| JP | 2017097139 | 6/2017 |

*Primary Examiner* — Eddy Saint-Vil
(74) *Attorney, Agent, or Firm* — Dorsey & Whitney LLP

(57) ABSTRACT

There is provided a learning management system comprising: a display; and a processing element in electronic communication with the display, the processing element configured to perform the following operations: generate a plurality of nodes, wherein the nodes correspond to an item of content; implement a testing module that selects a first node of the plurality of nodes to display on the display, wherein the first node outputs to the display one or more questions to a user and prompts the user to select an answer; and implement a confidence metric that prompts the user to select a value corresponding with the user's confidence that the selected answer is correct, wherein the selected answer and the confidence metric value for the first node are used to determine a second node from a plurality of nodes to display to the user next.

19 Claims, 6 Drawing Sheets

(56) References Cited

U.S. PATENT DOCUMENTS

| | | | |
|---|---|---|---|
| 7,024,399 B2* | 4/2006 | Sumner, II | G09B 7/00 |
| | | | 706/45 |
| 2006/0286533 A1* | 12/2006 | Hansen | G09B 7/02 |
| | | | 434/323 |
| 2012/0123801 A1* | 5/2012 | Opfer | G16H 70/20 |
| | | | 705/3 |
| 2012/0208166 A1* | 8/2012 | Ernst | G09B 7/08 |
| | | | 434/353 |
| 2012/0214147 A1 | 8/2012 | Ernst et al. | |
| 2014/0279727 A1* | 9/2014 | Baraniuk | G09B 7/00 |
| | | | 706/11 |
| 2014/0308646 A1* | 10/2014 | Wurth | G09B 7/04 |
| | | | 434/350 |
| 2014/0335497 A1* | 11/2014 | Gal | G09B 7/00 |
| | | | 434/323 |
| 2015/0006454 A1* | 1/2015 | Supanc | G06N 7/005 |
| | | | 706/25 |
| 2015/0170536 A1* | 6/2015 | Lan | G06N 20/00 |
| | | | 434/350 |
| 2015/0243179 A1* | 8/2015 | Zaslavsky | G06F 40/131 |
| | | | 434/327 |
| 2015/0325133 A1* | 11/2015 | Gaglani | G09B 7/00 |
| | | | 434/322 |
| 2016/0217701 A1* | 7/2016 | Brown | G09B 7/00 |
| 2017/0116870 A1 | 4/2017 | Connor et al. | |
| 2017/0178531 A1* | 6/2017 | Swank | G09B 7/08 |
| 2018/0012507 A1* | 1/2018 | Jeong | G09B 7/08 |
| 2019/0197912 A1* | 6/2019 | Burgin | G09B 5/02 |

* cited by examiner

1. The central dogma of molecular genetics states that the genetic information flows from ○ Amino acids ⟶ Proteins ⟶ DNA ○ DNA ⟶ Carbohydrates ⟶ Proteins ● DNA ⟶ RNA ⟶ Proteins ○ DNA ⟶ RNA ⟶ Carbohydrates Confidence Level |⊢――――――▮|
                  0%         100%

2. During cell growth, DNA synthesis takes place in

● S phase

○ G1 phase

○ G2 phase

○ M phase

Confidence Level |⊢―――▮――|
                  0%         100%

FIG. 4

LEARNING MANAGEMENT SYSTEMS AND METHODS THEREFOR

CROSS-REFERENCE TO RELATED APPLICATIONS

This application is a national stage application under 35 U.S.C. § 371 of International Application PCT/GB2019/050521, filed Feb. 26, 2019, which claims priority of GB Patent Application 1803270.6 filed Feb. 28, 2018, the disclosures of which are hereby incorporated by reference herein in their entireties.

TECHNICAL FIELD

The present disclosure relates generally to learning management systems for dynamically assessing knowledge of a given user on a given topic using a machine learning algorithm and methods of operating learning management systems.

BACKGROUND

Since the Internet came into general use, an associated corpus of archived information has been increasing exponentially, resulting in an increasing pool of knowledge. Humans now have access to more knowledge than at any other time in history relating to a vast number of topics. Whereas such an increase of available knowledge has undoubtedly benefited human society, it has also created a need to test humans in order to verify their understanding of relevant concepts.

Available information is now of such a volume and complexity that such information can be unmanageable for traditional education providers and online platforms to manage. Moreover, there arises a need to verify whether or not a given user, after receiving training, has achieved a sufficient degree of competence to serve third parties.

Applications such as online education, identification verification, password recovery and bot detection require users to provide answers to questions, as a form of competence testing. Traditional methods of testing, such as providing questions that pertain to a broad range of topics but without great detail, are susceptible to being circumvented by the users. The users can either guess, query search engines on the Internet, or search publicly-accessible records to plagiarize answers to questions. These traditional methods typically capture limited information that is mainly restricted to whether or not an answer to a given question is correct.

A common problem with online assessments of users' cognitive competence is a probability of guessing correct answers, particularly on multiple-choice tests such as a scholastic aptitude test or medical exams. Users can guess a certain percentage of answers correctly with an additional chance of scoring much higher. Another problem with traditional or conventional testing is an inability to assess a given user's level of knowledge pertaining to a given specific topic. For example, a given user who is being judged on a core topic might score well in retention of a particular field of that topic; however, traditional and predetermined methods of assessment cannot adapt to assess the topic further and instead blindly increase a difficulty of all topics as the tests progresses.

It is against the foregoing that aspects of the invention have arisen.

SUMMARY

According to an aspect of the invention, there is provided a learning management system comprising: a display; and a processing element in electronic communication with the display, the processing element configured to perform the following operations: generate a plurality of nodes, wherein the nodes correspond to an item of content; implement a testing module that selects a first node of the plurality of nodes to display on the display, wherein the first node outputs to the display one or more questions to a user and prompts the user to select an answer; and implement a confidence metric that prompts the user to select a value corresponding with the user's confidence that the selected answer is correct, wherein the selected answer and the confidence metric value for the first node are used to determine a second node from a plurality of nodes to display to the user next.

Learning management systems according to embodiments of the invention may further comprise a dynamic processing module configured to map the user's route through the plurality of nodes representing content in a particular subject area, wherein each time the user answers one or more questions through the testing module and confidence metric, the user's route is updated.

In one embodiment, the testing module comprises one or more multiple choice questions on the particular subject area or subset of information thereof.

The confidence metric may be a slider configured to prompt the user to select their confidence that their answer to a question is correct in a number format including 0 to 1 and 0% to 100%, or fractionally.

Learning management systems according to some embodiments of the invention may further comprise a sensing device configured to capture one or more parameters of the user.

According to another aspect of the invention there is provided a learning management system comprising a plurality of nodes stored on server with each node representing an item of content; a testing module implemented by the server and configured to transmit to a user display one or more questions to be displayed to a user and prompt the user to select an answer; a confidence metric implemented on the server configured to prompt the user to select a value corresponding with the user's confidence that the selected answer is correct; and a user profile implemented on the server and configured to record the user's selected answer and confidence metric value, wherein a performance baseline is determined by the user answering one or more questions and indicating their confidence that the answer to such questions is correct using the confidence metric, and wherein the performance baseline is updated each time the user answers a question.

According to another aspect of the invention there is provided a method of testing knowledge of a subject method, wherein the method comprises: i) generating a database arrangement of nodes of content modules corresponding to a knowledge assessment, wherein each of the nodes comprises a set of numeric attributes and weights associated with at least a difficulty or a theme of the content modules; ii) generating in a data memory arrangement of the data processing arrangement a multi-dimensional space with multiple axes based upon the database of nodes of content modules; iii) capturing a user's response with reference to a content module of a node using a graphical user interface (GUI) arrangement for communicating interactively with the database arrangement, and processing the user's response; iv) processing a probability of success in the response from the user as perceived by the user as a confidence metric using the graphical user interface arrangement; v) providing the response from the user and the confidence metric to a machine learning algorithm; vi) determining a probability distribution of success on a next node based upon a success of the response from the user on the content module of the node and the confidence metric; vii) ranking the nodes based upon a weight that is a function of the probability distribution; and viii) modularizing and representing the content modules to the user as a schedule based upon the ranking of the nodes.

The system may dynamically and iteratively increase or decrease a difficulty and/or specificity of the content module based upon the knowledge of the user on the topic.

According to another aspect of the invention there is provided a method of testing knowledge of a subject the method comprising: i) providing by a system including a processor, a plurality of content where each item of content is associated with a respective node in a multi axial network of nodes; ii) selecting by the system a first sub-set of nodes to display the corresponding content to a user; iii) providing by the system a test module to display on a display one or more test questions to the user based on the content represented by the first sub-set of nodes; iv) providing by the system a confidence metric module configured to prompt the user to select how confident they are that a selected answer to a question displayed by the test module is correct; v) recording by the system the user's answer to a question and the associated confidence metric value; vi) determining by the system the user's knowledge of the content represented by the first sub-set of nodes; vii) directing by the system the user to a second sub-set of nodes representing a first level of difficulty and/or content or a third sub-set of nodes representing a second level of difficulty and/or content, different to that represented by the second sub-set of nodes, depending on the user's determined level knowledge of the content represented by the first sub-set of nodes.

The method also helps the user to improve dynamically his/her knowledge on the topic, as aforementioned. The method further optionally enables a determination of strengths and weaknesses in the knowledge of the user on the topic to be generated. The method further enables distinguishing between users who are confident about their answers, from those who have guessed, socially engineered, or plagiarized them, in other words cheated in some manner.

In an embodiment, the response is obtained from the user by implementing the at least one knowledge assessment test associated with the content module of the node to the user. Then at least one knowledge assessment test may comprise questions associated with the content module of the node. The questions may be multiple-choice questions, usually comprising at least one correct answer, but optionally no correct answers.

A given question, in addition to being located, from a cognitive perspective, in a given tag space, a given concept space or a given theme space, has its own local theme-space; the local theme-space has dimensions associated therewith for each theme that the given question is testing. Moreover, one or more answers to the given question are located in a theme-space of the given question, so that a conditional probability of a given user understanding the given question is increased (for example maximized), if the user-chosen answer is correct. Moreover, appropriate conditional distributions can be learned by commonly known machine-learning techniques, for example using a neural network.

From the foregoing, it will be appreciated that a theme-space is a vector space with one or more suitable basis vectors representing one or more themes being tested. Moreover, each question's theme-space optionally has one or more extraneous dimensions so as to test for any possible confusion in the student. These extraneous dimensions are useable for testing whether or not the user has spurious associations between the aforementioned answers and often confuses concepts. Furthermore, wrong answers are positioned so as to test for combinations of spurious associations, should they be chosen by the user, to determine next questions to be used to test the user's knowledge.

In an embodiment, the machine-learning algorithm is implemented based upon Bayesian networks. A Bayesian network is a probabilistic graphical model that represents a set of variables and their conditional dependencies. In one embodiment this can be achieved via a directed acyclic graph. In the present invention, the Bayesian network represents the probabilistic relationships between different nodes of content within a multi-dimensional network of nodes.

The machine learning algorithm may arrange the questions, videos and other visitable content of the knowledge assessment test based upon a set of numeric attributes (for example, difficulty, theme, and so forth) of the content modules in such a way that a user who progresses through the content modules may require an increasing expertise. The metrics comprise a confidence level of the user on the topic as indicated by the user. In one embodiment, the confidence metric is a probability of success in the response from the user as perceived by the user. The nodes may comprise: (a) questions, (b) answers, (c) facts, for example.

The nodes may comprise the set of numeric attributes (for example, difficulty, theme, and so forth).

The machine learning algorithm may be trained to determine automatically an appropriate next node for the user; for example, based on a given user's response sensed via an interactive hardware sensing device, for example, a graphical user interface (GUI) hardware device with tactile and imaging sensing inputs, the machine learning algorithm determines a next appropriate node that reinforces switching between pseudo-analogue states in a hierarchy of pseudo-analog variable state machines that are present in the user's brain. The nodes may comprise: (a) questions, (b) videos, (c) animations, (d) images, (e) articles, (f) texts, (g) sound recordings, (h) diagrams, (i) augmented and virtual reality, (j) animations, (k) three dimensional models, for example.

In an embodiment, a test material may be the questions present in the at least one knowledge assessment test. The test material may comprise the questions related to the topic. In one embodiment, the particular topic for the user may be dynamically selected based upon a professional profile of the user (for example, based upon educational details of the user).

The machine learning algorithm may determine the schedule for providing an appropriate node to the user based upon the extent of knowledge of the user. The schedule may be implemented to provide the appropriate node to the user in timely manner. In one embodiment, the schedule may include different type of content on the topic.

The machine learning algorithm may learn the probability distribution (P) of success on the next node or nodes (for example, a future node or nodes) based upon following parameters: (a) success obtained by the user on the previous node or nodes (for example, a past node or nodes), (b) a confidence level of the user, (c) a question type, (d) a difficulty and/or specificity, for example.

Then, the machine learning algorithm may rank the next node or nodes with a weight or weights that is a function of (for example, proportional to) the probability distribution (P). The machine learning algorithm may select one or more nodes based upon the confidence level of the user. The nodes are optionally implemented as custom-designed digital hardware, data servers, computing devices that are configured to execute one or more software products. In an embodiment, the nodes comprise educational content modules. The probability distribution (P) is therefore determined from sensing the user's responses.

According to an embodiment, the method includes determining a distance metric as a function of topic relatedness among the multiple axes.

According to another embodiment, the method includes determining a trajectory of traversal of the content modules for the knowledge assessment to obtain a verification score using the machine learning algorithm, characterised in that the graphical user interface arrangement enables the user to view a profile of the user that includes the verification score. According to yet another embodiment, the method includes modifying the schedule of the content modules using the machine learning algorithm based upon information learned from a previous trajectory of the user and a distribution of trajectories of previous users. By using such a verification score, a given user is able to monitor his or her progress relative to other users.

According to yet another embodiment, the multiple axes comprise an axis that is dynamically generated based upon a response behaviour of the user compared to a response behaviour of other users in the database. According to yet another embodiment, the method includes processing a time taken by the user to provide the response and a metric adjustment and providing them as input to the machine learning algorithm to modify the schedule of the content modules.

In an embodiment, the machine learning algorithm may dynamically determine a response behaviour (for example, a time taken by the user to provide an answer to a question in response to a prompting question provided via a graphical user interface (GUI), a time taken by the user to provide a response to the at least one knowledge assessment test, a percentage of correct answers provided by the user, and so forth) of the user by comparing the response behaviour with response behaviour of existing users stored in the database arrangement. The machine learning algorithm optionally focuses on multiple choice questions, but optionally works with open ended questions as well, as well as images and sounds.

According to yet another embodiment, the method includes determining a knowledge corpus of the user on the topic using the machine learning algorithm based upon the trajectory of traversal taken by the user through the database of nodes of content modules, the response of the user, and the confidence metric provided as inputs to the machine learning algorithm.

According to yet another embodiment, the machine learning algorithm periodically makes a confirmation request to the user to confirm the response and provides an indication to the user that the confirmation request is made because the response is incorrect.

The graphical user interface (GUI) may obtain the response from the user; as aforementioned, the graphical user interface (GUI) can be provided on a device that has been adapted for implementing embodiments of the present disclosure. For example, the Graphical User Interface (GUI) is optionally provided on a smart phone that is operable to execute one or more software applications ("apps") (namely, one or more software programs, also known as software products) that are downloaded or otherwise provided to the smart phone.

The graphical user interface (GUI) arrangement may be used to: (a) implement the at least one knowledge assessment test, (b) obtain the plurality of metrics of the user response, and (c) provide the schedule to the user.

According to yet another embodiment, the machine learning algorithm selects suitable nodes to test an individual user's knowledge while maintaining a metric threshold, characterised in that the graphical user interface (GUI) enables the user to visualize, analyse and manipulate a weightage of each node.

The machine learning algorithm may generate a quantifiable user profile for the user based upon the user response to at least one knowledge assessment test and secondary knowledge tests.

According to yet another embodiment, the method includes determining a score based upon a correct response represented as a first tuple of numbers and the response of the user represented as a second tuple of numbers, wherein when the response of the user is correct, the score is determined as a non-zero score comprising a non-zero positive number for each component of the correct response. According to yet another embodiment, the non-zero score is a ratio of the magnitudes of the correct response and the response of the user. According to yet another embodiment, when the response of the user is wrong, the score is determined as zero if any of the components of the response of the user are not among the components of the correct response.

According to yet another embodiment, the confidence metric is obtained from the user through an interfacing element, for example any one of a slider, a graph and a scale. The interfacing element is beneficially implemented by adapting existing proprietary hardware. The confidence level of the user may be gathered through invisible metric gathering tools. The invisible metric gathering tools may comprise a time-to-answer (for example, a time taken by the user to answer the questions) to the knowledge assessment test and metric adjustments. In one embodiment, the response may be an answer for the knowledge assessment test. The confidence level of the user may be used to determine a behavioral and psychological profile of the user (for example, how the user assesses their own knowledge of a fact to respond to the at least one knowledge assessment test).

According to yet another embodiment, the method includes using the machine learning algorithm for predicting a future performance of the user based at least upon the response from the user on the content module of the node.

In an example embodiment, at least one knowledge assessment test is provided to students with a short test of material that records response of the students and their level of confidence on a particular topic. Based upon the response and confidence level of the students on the particular topic, the machine learning algorithm may determine the next optimal piece of knowledge (for example, by providing the nodes) to transfer in order to guide the student's knowledge retention towards a threshold on the particular topic. In one embodiment, the at least one knowledge assessment test is provided to medical students to determine their knowledge and confidence level on the topic using the machine learning algorithm. The determination of the knowledge and the confidence level may help the students to improve their knowledge on the particular topic, and may also help the students to enhance their preparation for exams that have multiple choice questions.

In one embodiment, the database is configured to update the nodes, for example in an iterative manner. The schedule may be modified to provide the nodes to the user in real time on a periodic or continual basis. The nodes that are stored in the database arrangement may be access by the user to update or add information to the content modules. In one embodiment, the schedule is dynamically modified by the system or by the user by accessing the database through the graphical user interface arrangement. The user may have access to the schedule stored in the database arrangement.

In an embodiment, the database may comprise the nodes with varying weights for each node.

In one embodiment, the method may comprise implementing secondary knowledge tests after providing the nodes to the user to test his or her knowledge. The secondary knowledge tests may be implemented to test knowledge of the user after providing the nodes to the user. The secondary knowledge tests may test the knowledge of the user after providing the nodes. In one embodiment, the node comprises a study material for the user.

In another embodiment, the method may comprise providing confirmation messages to the user to confirm that a response to a question of the at least one knowledge assessment test or the secondary knowledge tests is correct; and determining the plurality of metrics comprising at least a confidence level of the user on the topic based upon the user's response to the questions of the at least one knowledge assessment test or the secondary knowledge tests. The confidence level of the user on the topic may be determined based upon a confirmation on the confirmation messages provided to the user while selecting an answer to the at least one knowledge assessment test. In one embodiment, the confirmation messages may not be provided to the user when the user selects a correct answer. The confirmation messages are provided to the user through the user interface. The machine learning algorithm may take as an input a selection on whether or not the user is confirming the confirmation messages. If the user confirms the confirmation messages when a confirmation message is displayed for the first time, the machine learning algorithm determines the confidence level of the user for a particular question as high. If the user confirms the confirmation messages when the confirmation message displays second time, the machine learning algorithm determines the confidence level of the user for a particular question as medium. Similarly, if the user cancels the confirmation messages, the machine learning algorithm determines the confidence level of the user for a particular question as low. The machine learning algorithm determines the confidence level of the user on the topic by taking into account of confidence level of the user for each question in the at least one knowledge assessment test. For example, the machine learning algorithm determines that the confidence level of the user on the topic in a range of 0% to 100%. The machine learning algorithm provides the confirmation messages to the user when the user selects an incorrect answer.

In yet another embodiment, the method may comprise modifying the schedule for providing the appropriate nodes to the user based upon results of the secondary knowledge tests. The schedule may be modified based upon a plurality of metrics associated with the user response for the secondary knowledge tests. The schedule may be modified based upon the extent of knowledge of the user after the secondary knowledge tests. In one embodiment, the schedule may be determined and modified by the machine learning algorithm.

In yet another embodiment, the method may comprise providing a score for the user based upon the knowledge of the user on the topic. The score may be provided to the user based upon the extent of knowledge of the user after the at least one knowledge assessment test. In one embodiment, the score may be provided to the user based upon the extent of knowledge of the user after the secondary knowledge tests. The score may be calculated and provided to the user by the machine learning algorithm. The score may be provided to the at least user on the particular topic.

In one embodiment, the method may comprise providing a high score to the user when the user provides a correct answer to questions of the at least one knowledge assessment test without getting the confirmation messages. The confidence level of the user on the topic may be determined as high when the user scores high on the at least one knowledge assessment test. In an embodiment, the score may be calculated and provided by the machine learning algorithm. The machine learning algorithm may provide the high score to the user when the user giving a correct answer to questions of the at least one knowledge assessment test. The machine learning algorithm may provide the low score to the user when the user giving an incorrect answer to the questions of the at least one knowledge assessment test.

The present disclosure provides also a computer program product comprising a non-transitory computer-readable storage medium having computer-readable instructions stored thereon, the computer-readable instructions being executable by a computerized device comprising processing hardware to execute a method as described above.

The present disclosure also provides a machine learning system comprising a server arrangement and a graphical user interface arrangement for dynamically assessing knowledge of a user on a topic using a machine learning algorithm, comprising: a processor arrangement; a memory configured to store a database arrangement of nodes of content modules corresponding to a knowledge assessment, wherein each of the nodes comprises a set of numeric attributes and weights associated with at least a difficulty or a theme of the content modules, wherein the memory is configured to store program codes comprising: a content dimension generation module implemented by the processor arrangement configured to generate a multi-dimensional space with multiple axes based upon the database of nodes of content modules; a confidence metric module implemented by the processor configured to process a response from a user with reference to content module of a node using a graphical user interface arrangement for communicating interactively with the database arrangement, wherein the confidence metric module is configured to determine a probability of success in the response from the user as perceived by the user as a confidence metric using the graphical user interface, wherein the response from the user and the confidence metric are provided to the machine learning algorithm; a success probability module implemented by the processor arrangement configured to determine a probability distribution of success on a next node (for example, a future nodes) based upon a success of the response from the user on the content module of the node and the confidence metric; a node ranking module implemented by the processor configured to rank the nodes based upon a weight that is a function of (for example, proportional to) the probability distribution; and a content modularization module implemented by the processor arrangement configured to modularize and represent the content modules to the user as a schedule based upon the ranking of the nodes.

According to an embodiment, the machine learning system is configured to determine a knowledge of the user on a set of concepts using the machine learning algorithm based upon a trajectory of traversal taken by the user through the database arrangement of nodes of content modules, the response of the user, and the confidence metric provided as inputs to the machine learning algorithm.

According to an embodiment, the machine learning system includes a scoring module configured to determine a score based upon a correct response represented as a first tuple of numbers and the response of the user represented as a second tuple of numbers, wherein when the response of the user is correct, the score is determined as a non-zero score comprising a non-zero positive number for each component of the correct response.

According to another embodiment a method for dynamically displaying learning content to a user is provided, the method comprising: linking by a processor a plurality of content nodes, wherein the content nodes correspond to learning content and at least some of the content nodes include questions corresponding to a subject; outputting by the processor to a display, a first content node of the plurality of content nodes, wherein the first content node includes one or more subject matter user questions; receiving by the processor a first user answer input by a user, the first user answer corresponding to the one or more subject matter questions of the first content node; outputting by the processor to the display a confidence metric corresponding to a confidence level in the accuracy of the first user answer; receiving by the processor a first user confidence metric input by the user corresponding to the confidence level in the accuracy of the first user answer; determining by the processor a second node to display based on the first user answer and the first user confidence metric; and outputting to the display by the processor, the second content node.

Embodiments of the present disclosure may eliminate the limitations in improving knowledge of users quickly and assessing them accurately. The embodiments of the present disclosure may improve the knowledge of the user by assessing the knowledge of the user using the machine learning algorithm. The embodiments of the present disclosure may enhance hiring of suitable candidates for a job by gaining better insight about candidates who are appearing for an interview. The embodiments of the present disclosure are beneficial to use to detect cheating during examinations, to determine an extent of the user's knowledge and memory retention. The embodiments of the present disclosure optionally provide assessments to employees within a company to determine their knowledge and confidence level on a particular topic; such determination can be important from a safety and reliability point of view. The embodiments of the present disclosure are susceptible to being used to match people with complementary knowledge for team building.

BRIEF DESCRIPTION OF THE DRAWINGS

Embodiments of the present disclosure will now be described, by way of example only, with reference to the following diagrams wherein:

FIG. 3 is a schematic illustration of a multi-dimensional space with multiple axes based upon a database of nodes of content modules in accordance with an embodiment of the present disclosure, optionally, the content modules are implemented by respective data processing hardware, data server hardware and similar;

FIG. 4 is an exemplary view of a graphical user interface in accordance with an embodiment of the present disclosure provided by the machine learning system of FIG. 1 when in operation;

DESCRIPTION

Figure 1:
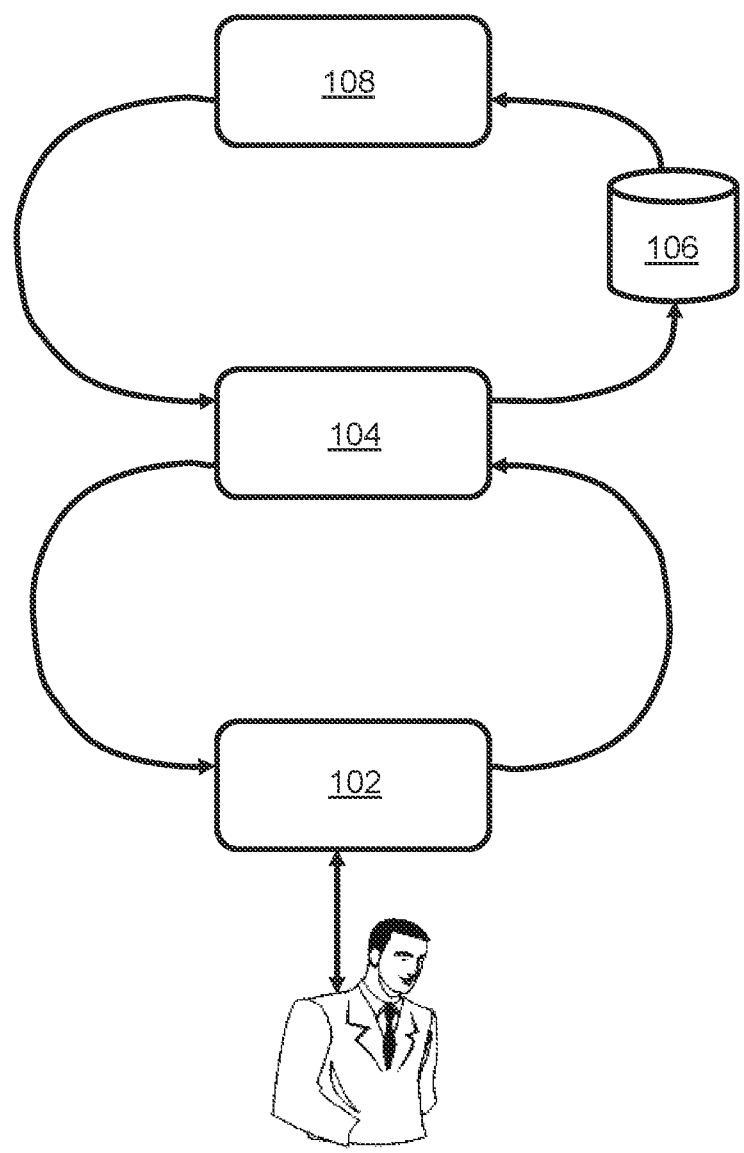
FIG. 1 is a schematic illustration of a machine learning system, wherein the machine learning system employs at least one device for implementing a user interface, in accordance with an embodiment of the present disclosure.

FIG. 1 is a schematic illustration of a machine learning system in accordance with an embodiment of the present disclosure. The machine learning system comprises a graphical user interface arrangement 102, a server arrangement 104, a server database arrangement 106, a machine learning component 108 and a sensing device 110; the sensing device 110 is optionally an existing sensing device that is configured, namely adapted, for implementing embodiments of the present disclosure (for example a personal computer, a laptop computer, a tablet computer, a smart phone). The graphical user interface arrangement 102 includes a single graphical user interface or, alternatively, a plurality of graphical user interfaces. Likewise, the server arrangement 104 includes a single server or, alternatively, a plurality of servers. The server arrangement 104 includes one or more processors or processing elements that process, receive, and execute instructions. The processors may be in communication with one or more memory components. The memory components store electronic data used by the server arrangement. The memory may include magneto-optical storage, read only memory, random access memory, erasable programmable memory, flash memory, or a combination of the like. In many instances, the memory may store instructions for the processor to execute and may a be non-transitory, machine-readable medium.

The server arrangement 104 generates a database (for example, a media database) of nodes of content modules corresponding to a knowledge assessment. The server arrangement 104 generates a multi-dimensional space with multiple axes based upon the database of nodes of content modules. The server arrangement 104 processes a response entered by a user via the sensing device 110 with reference to content module of a node using the graphical user interface arrangement 102. The server arrangement 104 stores the response in the server database arrangement 106. In an embodiment, the server arrangement comprises the server database arrangement 106 and the machine learning component 108. The server arrangement 104 processes a probability of success in the response from the user as perceived by the user as a confidence metric using the graphical user interface arrangement 102. The response from the user and the confidence metric are provided to the machine learning component 108. The machine learning component 108 comprises a machine learning algorithm. The machine learning algorithm determines a probability distribution of success on a next node (for example, a future nodes) based upon a success of the response from the user on the content module of the node and the confidence metric and optionally the specificity of each concept and/or any additional pre-determined variables of interest. The machine learning algorithm ranks the nodes based upon a weight that is a function of (for example, proportional to) proportional to the probability distribution. The machine learning algorithm modularizes and represents the content modules to the user as a schedule based upon the ranking of the node. The machine learning component 108 may communicate the modularized content modules and the schedule to the server 104. The server 104 delivers the modularized content modules and the schedule to the user through the graphical user interface arrangement 102.

Figure 2:
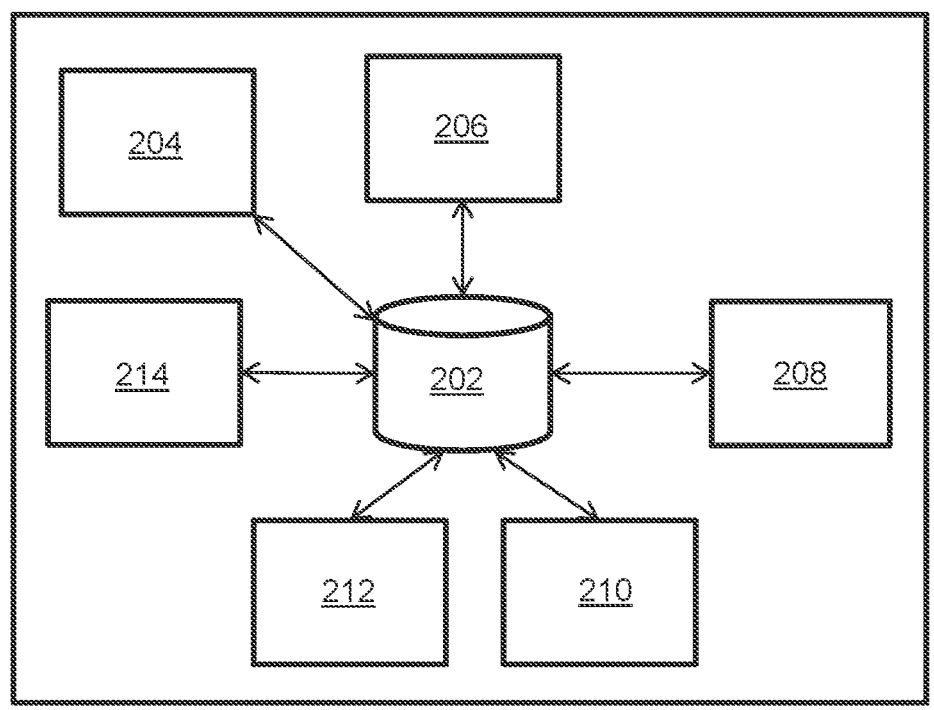
FIG. 2 is a functional block diagram of a server arrangement supporting data supply for the machine learning system of FIG. 1, in accordance with an embodiment of the present disclosure.

FIG. 2 is a functional block diagram of a machine learning system in accordance with an embodiment of the present disclosure. The functional block diagram of the machine learning system comprises a database arrangement 202, a content dimension generation module 204, a confidence metric module 206, a success probability module 208, a node ranking module 210, a content modularization module 212 and a scoring module 214. These modules function as has been described above, one or more software products that are executable upon computing hardware, The modules 202, 204, 206, 208, 210, 212 and 214 of the machine learning system are operable to supply training subject matter to one or more users, and also to receive response from the one or more users.

Figure 3:
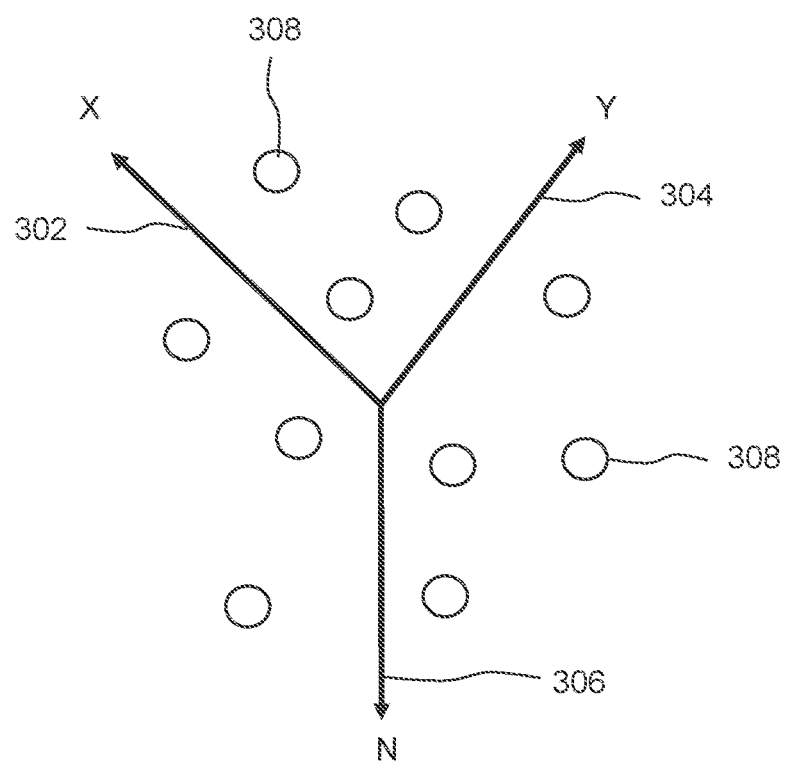

FIG. 3 is a schematic illustration of a multi-dimensional space (for example, a Euclidean space) with multiple axes based upon a database arrangement of nodes of content modules in accordance with an embodiment of the present disclosure. The database arrangement comprises a plurality of metrics and a plurality of nodes 308; the metrics are determined. The plurality of metrics comprises a metric X 302, a metric Y 304 and a metric N 306. The plurality of metrics comprises a confidence metric, which is determined by processing a probability of success in the response from the user as perceived by the user. The plurality of nodes 308 may comprise questions, answers, facts and content modules corresponding to a knowledge assessment. The content modules may comprise videos, animations, images, texts, sounds recordings, diagrams, augmented and virtual reality representations, animations, three dimensional models, and so forth. Each of the nodes comprises a set of numeric attributes and weights associated with at least a difficulty or a theme of the content modules.

FIG. 4 is an exemplary view of a graphical user interface (GUI) arrangement 402 in accordance with an embodiment of the present disclosure. The graphical user interface (GUI) arrangement 402 includes a pixel array screen on which, in operation, one or more questions (namely, interrogating subject matter) related to content modules of a node are provided to a user to obtain a response from the user. Optionally, the graphical user interface (GUI) arrangement 402 comprises a slider 404 for each of the questions to obtain a confidence metric of the user while responding to each of the questions. Optionally, a plurality of sliders, for example in a range of two to ten sliders, more optionally five sliders, are provided on the sensing device 110 for use by the user when answering the questions (interrogating subject matter), and the user is required in operation to respond by suitably positioning the sliders. Optionally, the user is interrogated by a same given question a plurality of times; each time the given question is repetitively shown to the user, the user is required to manipulate the sliders in a different manner. As the user is interrogated, questions can be pulled in from multiple different nodes that are either within or outside a given area of content. The slider arrangement can be in horizontal or vertical slider orientations, relative to an upright orientation of a user employing the graphical user interface (GUI) 402 in practice. Although the multiple choice questions shown have only a single correct answer, certain embodiments may pose questions to a user that have more than one correct answer. The user's answer to a given question and his/her confidence that the answer is correct is used to provide a score that determines which node, or series of nodes to display to the user next. Take the simplest form of this as shown in FIG. 4. Here, the user is asked to select one of four answers in a multiple choice question. The user selects the answer that he/she believes to be correct. In addition, the user selects how confidence he/she is that the selected answer is correct. This level of confidence is selected using the slider 404 and will indicate how confident the user is in the correctness of his/her answer as a percentage. The score assigned to the user's answer is dependent on whether the answer is correct and the confidence level selected by the user. Assume that a maximum score of 1 is available for an answer that is correct and the user has indicated that they are 100% confident that the answer is correct. Then, if the user obtains the correct answer but is only 50% confident that the answer is correct they may be awarded a score of only 0.5, for example. If the user selects an answer that is incorrect and a confidence of 100% that that answer is correct they may be awarded a score of 0 or −1 if negative scoring is employed. This process can be applied to a more complex scenario where each answer to a multiple choice question has a slider 404 associated with it. In this case, again, if the user selects the correct answer and indicates that they are 100% confident that their answer is correct they may be awarded a score of 1. However, if the user selects the correct answer but indicates they are only 40% confident that their answer is correct but they feel there is a 30% chance that each of two other answers might be correct, the user will be awarded a score determined by an algorithm that takes into account the uncertainty demonstrated by the user. The score awarded to a user as a result of all questions posed in a node, or series of nodes, is used to determine the next node, or series of nodes to present to the user. In one embodiment, a threshold score is used to determine which node, or series of nodes, to present to the user.

Optionally, dynamic switching in operation between horizontal and vertical slider orientations is employed to enhance user engagement when challenged with the interrogating subject matter, and to try to avoid the user merely recording finger orientations with respect to the challenging subject matter.

The response from the user and the confidence metric are provided to the machine learning algorithm to determine a probability distribution of success on a next node.

Figure 5A:
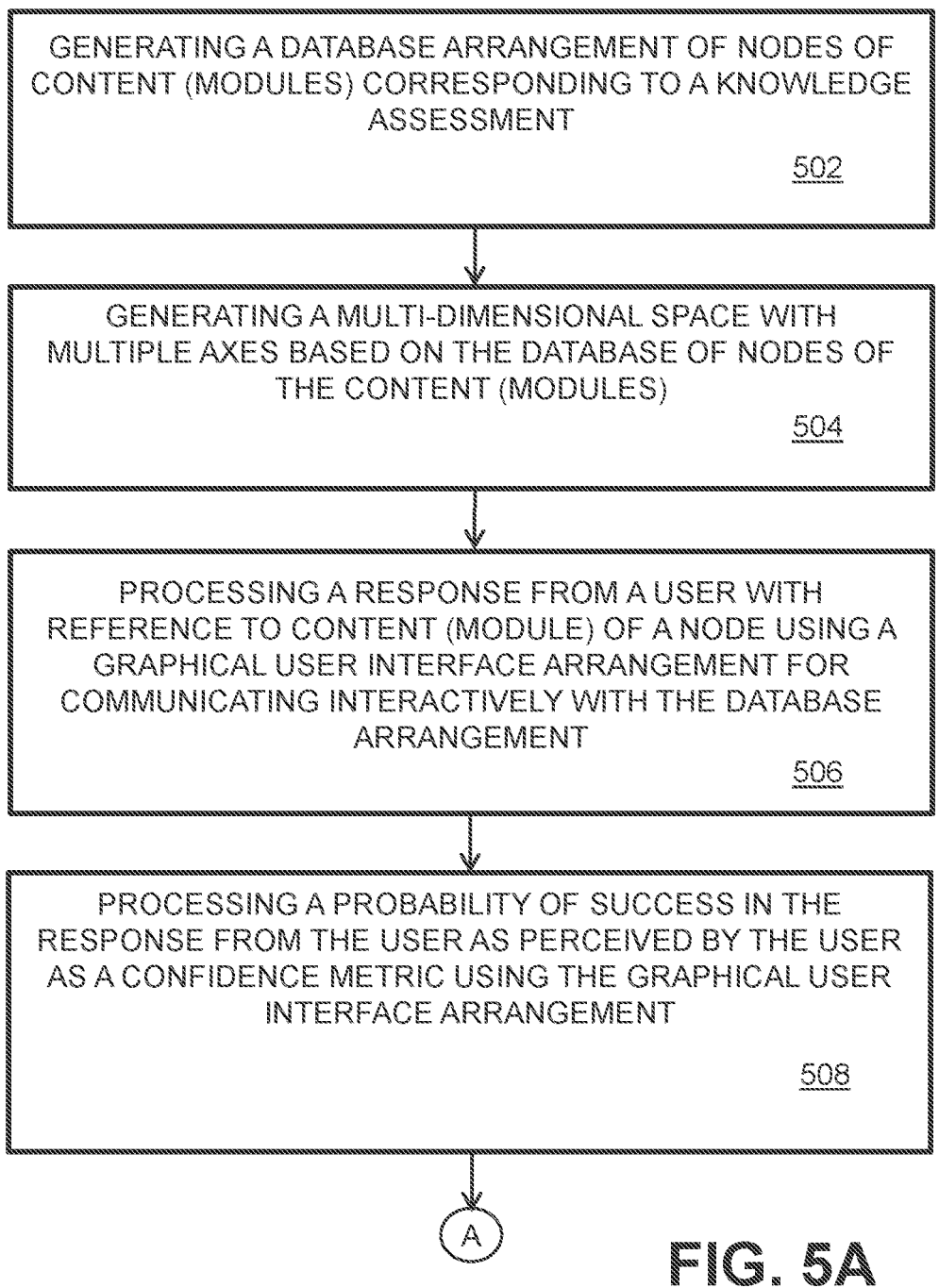
FIGS. 5A and 5B are flow diagrams illustrating a method of using a machine learning arrangement for dynamically assessing knowledge of a user on a topic using a machine learning algorithm in accordance with an embodiment of the present disclosure.
Figure 5B:
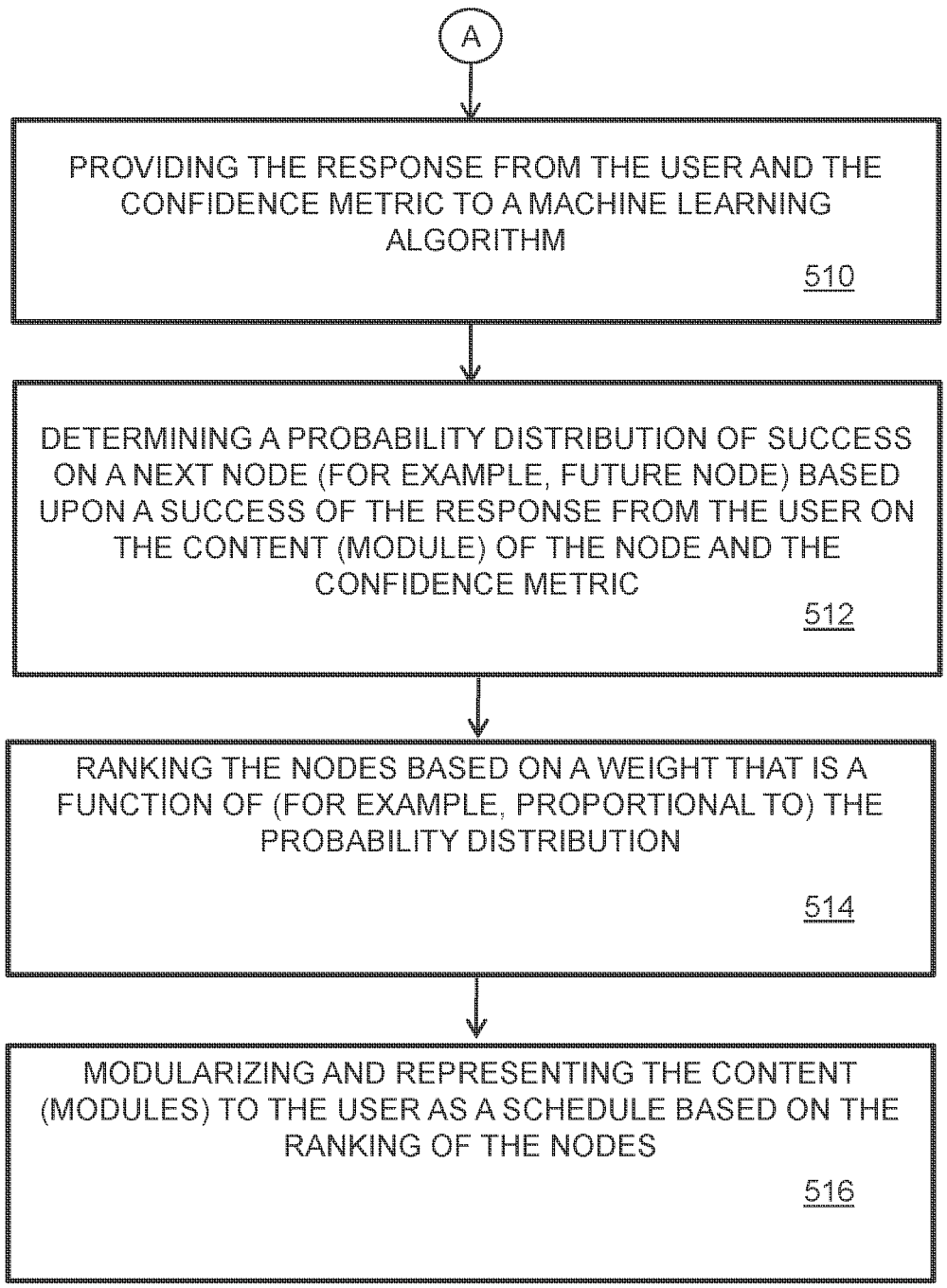

FIGS. 5A and 5B are flow diagrams illustrating a method of (US English: "for") dynamically assessing knowledge of a user on a topic using a machine learning algorithm in accordance with an embodiment of the present disclosure. At a step 502, a database arrangement of nodes of content modules corresponding to a knowledge assessment is generated. Each of the nodes comprises a set of numeric attributes and weights associated with at least a difficulty or a theme of the content modules. At a step 504, a multi-dimensional space with multiple axes is generated based upon the database of nodes of the content modules. At a step 506, a response from a user with reference to content module of a node is processed using a graphical user interface arrangement for communicating interactively with the database arrangement. At a step 508, a probability of success in the response from the user as perceived by the user is processed as a confidence metric using the graphical user interface. At a step 510, the response from the user and the confidence metric are provided to the machine learning algorithm. At a step 512, a probability distribution of success on one or more subsequent nodes is determined based upon a success of the response from the user on the content module of a previous node or nodes and previous confidence metric or metric. At a step 514, the nodes are ranked based upon a weight that is a function of (for example, proportional to, but not limited thereto) the probability distribution. At a step 516, the content modules are modularized and represented to the user as a schedule based upon the ranking of the nodes.

When using the aforementioned machine learning system to test an understanding of a given user, it will be appreciated that questions have interdependencies because there is overlap in concepts that the questions seek to test. Thus, if the given user is highly familiar with a given subject matter, then the given user getting one question right predicts that the given user will be able also to answer certain other questions correctly (excluding mistakes made by the given user). Thus, in operation of the machine learning system, it will be appreciated that there are dependencies between all the answers to all the questions. Therefore, if it is known that the given user has selected a given answer to a given question, then it is feasible to predict how the given user will answer other subsequent questions.

In respect of a given example module of questions, a probability of a question being answered correctly at random is the same; for example, there pertain to the questions a Gaussian-type distribution regarding a probability of users guessing answers correctly for the questions.

However, when the given user understands a given field of knowledge, then, when the user answers a question correctly, that means that a probability of certain other questions being answered correctly by that given user is higher. That is, some questions have a higher conditional probability of being answered correctly given that certain other questions have been answered correctly. Some questions have a higher conditional probability of being answered incorrectly given that the given user has answered certain other questions incorrectly.

Therefore, in the machine learning system, knowledge of certain concepts increases, for example maximizes, a conditional probability of getting a right answer to a corresponding posed question via the graphical user interface arrangement (GUI) 402.

Each question, in addition to being located in an attribute space, has its own local attribute-space having dimensions for each theme it is testing. Moreover, correct answers to a given question are located at positions which increase, for example maximize, a conditional probability of them being correctly determined from attributes of their associated given question. Moreover, wrong answers have a high conditional probability when there are extraneous attributes of their associated questions. Appropriate conditional distributions can, for example, be learned by employing commonly-known machine-learning techniques (for example, by employing neural networks) or learned manually.

Modifications to embodiments of the present disclosure described in the foregoing are possible without departing from the scope of the present disclosure as defined by the accompanying claims.

The invention claimed is:

1. A learning management system comprising:
a display; and
a processing element in electronic communication with the display, the processing element configured to perform operations comprising:

generate a multi-dimensional space comprising a plurality of nodes, wherein the plurality of nodes correspond to a plurality of content items and comprise a set of numeric attributes and weights associated with at least one of a difficulty of the plurality of content items and a theme of the plurality of content items;

output, to the display and via a graphical user interface (GUI), a first content item of the plurality of content items corresponding to a first node of the plurality of nodes and first one or more questions related to the first content item, wherein the first one or more questions is associated with a set of potential answers;

prompt a user to select, for each of the first one or more questions, an answer of the set of potential answers via the GUI;

provide, via the GUI and for each of the one or more questions, a set of sliders to indicate a confidence metric value for a confidence metric, the confidence metric indicating a confidence of the user in the answer, wherein each slider in the set of sliders corresponds to a respective potential answer of the set of potential answers, and wherein each slider in the set of sliders has an arrangement relative to an orientation of the GUI, the arrangement comprising a vertical or horizontal orientation;

receive a selection of a slider of the set of sliders, wherein the selected slider is associated with the answer, the selection indicating the confidence metric value for the confidence metric;

identify a second node from the plurality of nodes in the multi-dimensional space based on a probability distribution of success on the second node, wherein the probability distribution of success is determined using a Bayesian network and based on the selected answer and the confidence metric value for the first node;

output, to the display and via the GUI, based on the second node, second one or more questions related to the second content item;

output, to the display and via the GUI, the first one or more questions related to the first content item at least a second time, wherein the set of sliders is outputted to the display via the GUI when the first one or more questions is outputted at least the second time; and automatically and dynamically switch the arrangement of at least one slider in the set of sliders relative to the orientation of the GUI when the first one or more questions related to the first content item is outputted at least the second time.

2. A learning management system according to claim 1, wherein the processing element further maps a route of the user through the plurality of nodes, wherein each time a corresponding answer is received for a particular question of the one or more questions, the route is updated.

3. A learning management system according to claim 1, wherein the first node corresponds to one or more multiple choice questions on a particular subject area or subset of information thereof.

4. A learning management system according to claim 1, wherein the slider is in a number format including 0 to 1 and 0% to 100%, or fractionally.

5. A learning management system according to claim 1, wherein one or more of the confidence metric value, a veracity, and a specificity, at one or more of a time of response and at a previous time point, is used to process the probability distribution of success.

6. A learning management system according to claim 5 wherein the processing element further determines a probability distribution of success on one or more subsequent nodes of the plurality of nodes based upon one or more of the users response to a previous node or nodes and the confidence metric value, veracity, specificity, each at one or more of a time of response and one or more previous time points, or success of the selected answer.

7. A learning management system according to claim 5 further comprising the step of ranking the plurality of nodes after each response from the user and representing the content of one or more next nodes of the plurality of nodes as a schedule based on one or more of: the selected answer and confidence metric, veracity, specificity, or the ranking of the nodes, each at one or more of a time of response and a previous time point, wherein the nodes are ranked as a function of the probability distribution of success.

8. A learning management system according to claim 1, wherein:
the plurality of nodes are stored on a server with each node representing an item of content;
the learning management system is implemented by the server and is configured to transmit to the display the one or more questions to be displayed to the user and prompt the user to select the answer;
the confidence metric is implemented on the server or a client; and
a user profile is implemented on the server and is configured to record the selected answer and confidence metric value, wherein a performance baseline is determined by the user answering one or more questions and indicating their confidence that the answer to the one or more questions is correct using the confidence metric value, and wherein the performance baseline is updated each time the user answers a question.

9. A method of verifying test performance using the learning management system of claim 1, wherein the method comprises:
capturing and recording one or more parameters of a user of the learning management system, wherein the capturing and the recording includes providing the set of sliders to indicate the confidence metric value for the confidence metric indicating the confidence of the user in the answer and receiving the selection of the slider of the set of sliders;
creating a user profile of the user including identity information and the one or more parameters of the user to create baseline values of said one or more parameters;
monitoring said one or more parameters of the user instantaneously when the user answers questions displayed at the display;
comparing the instantaneous parameters of the user with the baseline parameters of the user stored in the user profile; and
selecting next content to be displayed to the user dependent on whether the one or more parameters are at, above or below the baseline.

10. A method of verifying test performance according to claim 9, further comprising the step of issuing an alert if the instantaneous parameters of the user do not match the baseline parameter values of the user.

11. A method of verifying test performance according to claim 10, further comprising the step of restricting access to the learning management system until the alert is cancelled by a supervisory user of the learning management system.

12. The learning management system of claim 1 further comprising a hardware input device configured to receive tactile and imaging sensing inputs, wherein the selection of the slider of the set of sliders is received via the hardware input device, and wherein the arrangement of the slider relative to the orientation of the GUI corresponds to an orientation of the hardware input device.

13. The learning management system of claim 1, the operations further comprise:
train a machine learning model to determine a next node of the plurality of nodes in response to a received input, wherein the machine learning model is trained to determine the next node based on a desired pseudo-analogue state, and wherein the second node is identified using the trained machine learning model.

14. The learning management system of claim 13, wherein the operations further comprise:
generate, by the machine learning model, a node schedule based on a ranking of the plurality of nodes, wherein the second node is identified based on the node schedule;
continuously monitor to detect inputs indicating updates to the plurality of nodes; and
iteratively update the node schedule in real time based on the detected inputs until no additional inputs are detected.

15. A method of testing knowledge of a subject the method comprising:
generating, by a processor, a multi-axial network of nodes based on a plurality of content items where each item of the plurality of content items is associated with a respective node in the multi-axial network of nodes, wherein the nodes in the multi-axial network of nodes comprise a set of numeric attributes and weights associated with at least one of a difficulty of the plurality of content items and a theme of the plurality of content items;
outputting, to a user via a graphical user interface (GUI) on a display, at least a first content item of the first plurality of content items corresponding to a first node of the nodes in the multi-axial network of nodes;
displaying, via the GUI, one or more test questions to the user based on the at least the first content item corresponding to the first node, wherein the one or more test questions is associated with a set of potential answers;
prompting the user to select an answer of the set of potential answers to each of the one or more test questions via the GUI;
providing, via the GUI and for each of the one or more test questions, a set of sliders to indicate a confidence metric value for a confidence metric, the confidence metric indicating a confidence of the user in the answer, wherein each slider in the set of sliders corresponds to a respective potential answer of the set of potential answers, and wherein each slider in the set of sliders has an arrangement relative to an orientation of the GUI, the arrangement comprising a vertical or horizontal orientation;
receiving a selection of a slider of the set of sliders, wherein the selected slider is associated with the answer, the selection indicating the confidence metric value for the confidence metric;
recording the selected answer and the associated confidence metric value;

determining, by the processor, the users knowledge of the content represented by the first node based on the selected answer and the confidence metric value;

directing, by the processor, the user to a second node of the multi-axial network of nodes associated with one of a first level of difficulty and at least a second content item or a third node of the multi-axial network of nodes associated with one of a second level of difficulty and at least a third content item, different to that represented by the second node, based on a probability distribution of success on the second node and the third node, wherein the probability distribution of success is determined using a Bayesian network and depending on the users knowledge of the content represented by the first node displaying, via the GUI, the one or more test questions least a second time, wherein the set of sliders is outputted to the display via the GUI when the one or more test questions is displayed at least the second time; and automatically and dynamically switching the arrangement of at least one slider in the set of sliders relative to the orientation of the GUI when the one or more test questions related to the first content item is displayed at least the second time.

16. A method of testing knowledge of a subject according to claim 15, wherein the method further comprises the step of prompting the user to issue an oral command in connection with selection of an answer to a question.

17. A method of testing knowledge of a subject according to claim 15 further comprising the step of recording an amount of time the user is actively engaged with the content and wherein the recorded time is used in the determination of the user's knowledge of the content represented by the first node.

18. A method of testing knowledge of a subject, wherein the method comprises:
generating, by a processor, a database arrangement of nodes corresponding to content modules of a knowledge assessment, wherein each of the nodes comprises a set of numeric attributes and weights associated with at least one of a difficulty of the content modules or a theme of the content modules;

generating, by the processor, in a data memory associated with the processor, a multi-dimensional space with multiple axes based upon the database arrangement of nodes;

capturing a response from the subject to a content module of the content modules corresponding to a node of the database arrangement of nodes, wherein the response is captured using a graphical user interface (GUI) arrangement in communication with the processor, and wherein the capturing includes providing a question related to the content module and a set of sliders via the GUI to indicate a confidence metric value for a confidence metric indicating a confidence of a user in an answer to the question and receiving a selection of a slider of the set of sliders, each slider in the set of sliders being associated with a potential answer, wherein each slider in the set of sliders has an arrangement relative to an orientation of the GUI, the arrangement comprising a vertical or horizontal orientation;

determining, by the processor, a probability of success in the response from the subject as perceived by the subject as the confidence metric, wherein the confidence metric value is obtained from the subject using the slider;

providing, by the processor, the response from the user and the confidence metric to a machine learning algorithm;

determining, by the processor, using the machine learning algorithm, a probability distribution of success on a next node of the nodes of the database arrangement using a Bayesian network and based upon a success of the response from the user and the confidence metric;

ranking, by the processor, the nodes of the database arrangement based upon a weight that is a function of the probability distribution of success;

modularizing and representing the content modules to the user as a schedule based upon the ranking of the nodes of the database arrangement;

capturing, at least a second time, the response from the subject to the content module of the content modules corresponding to the node of the database arrangement of nodes, wherein the capturing at least the second time includes providing the question related to the content module and the set of sliders via the GUI and automatically and dynamically switching the arrangement of at least one slider in the set of sliders relative to the orientation of the GUI.

19. A method of testing knowledge of a subject according to claim 18, wherein the method further comprises the step of dynamically and iteratively increasing or decreasing a difficulty and/or specificity of the content module based upon knowledge of the subject.

* * * * *